United States Patent Office 3,104,349
Patented Sept. 17, 1963

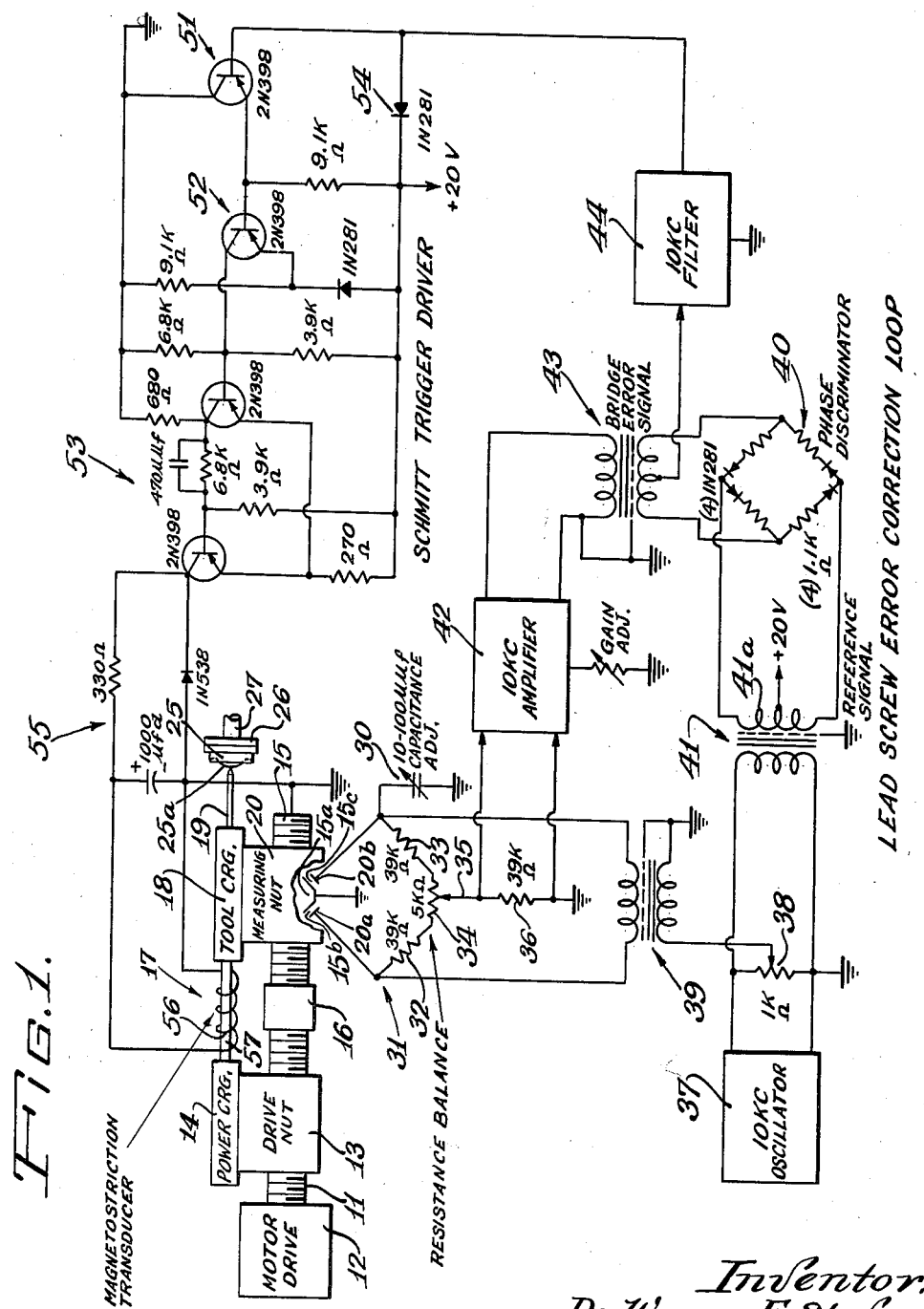

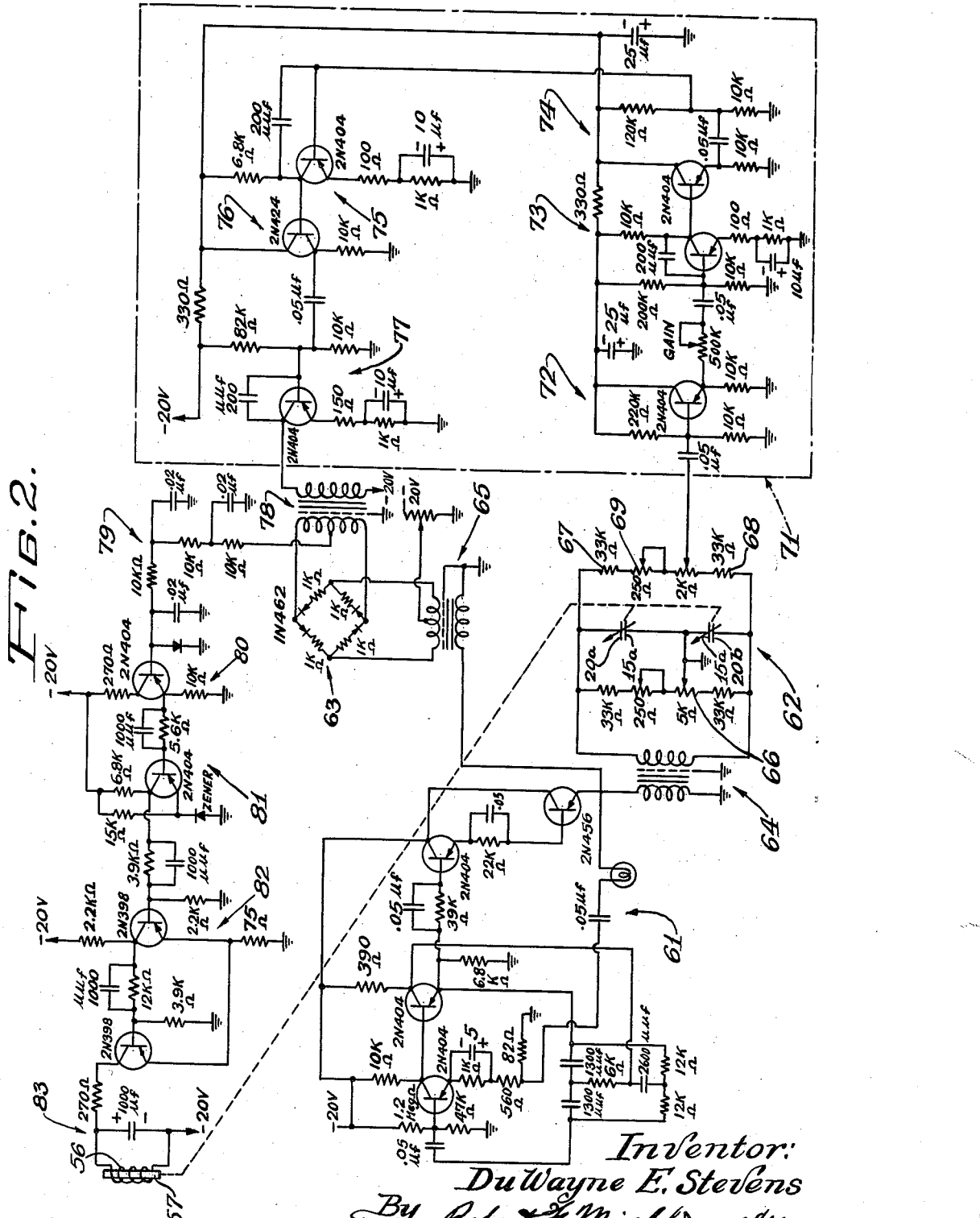

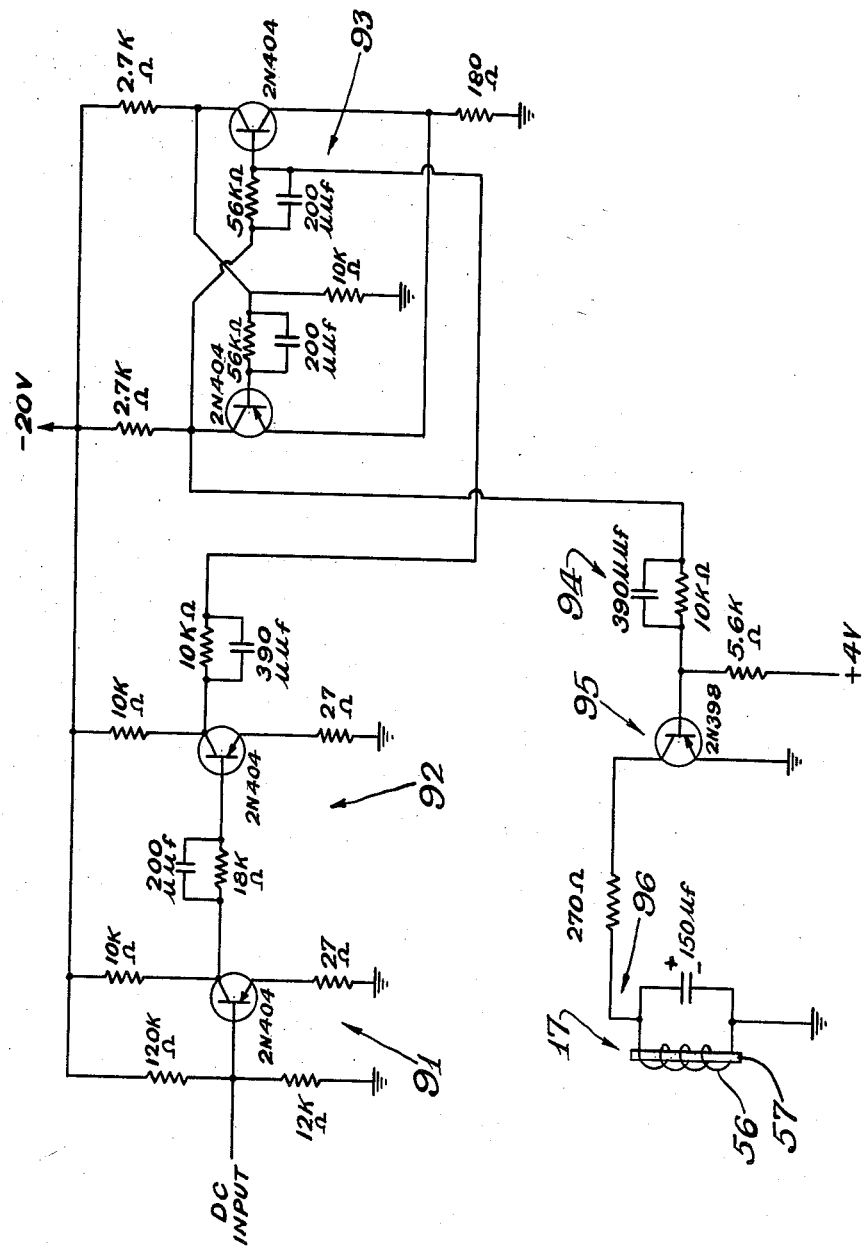

3,104,349
BACKLASH COMPENSATION POSITION
CONTROL SERVOSYSTEM
Du Wayne E. Stevens, Morton Grove, Ill., assignor to Bell
& Howell Company, Chicago, Ill., a corporation of
Illinois
Filed Aug. 8, 1960, Ser. No. 48,148
4 Claims. (Cl. 318—22)

This invention relates to servo systems, and more particularly to servo circuits for precisely positioning a tool of an aspheric lens grinding machine.

An object of the invention is to provide new and improved servo systems.

Another object of the invention is to provide electronic servo systems which are very rapid and precise in their operation.

Another object of the invention is to provide servo systems in which error in feed of a tool moved by a carriage is sensed by electrostatic means including a phase discriminator, and a transducer is actuated accordingly to correct the position of the tool.

A complete understanding of the invention may be obtained from the following detailed description of servo systems forming specific embodiments thereof, when read in conjunction with the appended drawings, in which:

FIG. 1 is a schematic view of a servo system forming one embodiment of the invention;

FIG. 2 is a wiring diagram of a circuit of a servo system constituting an alternate embodiment of the invention; and FIG. 3 is a wiring diagram of a circuit forming a part of a servo system constituting an alternate embodiment of the invention.

The invention provides a servo system which may be used, for example, to correct error in the feed of a tool relative to work, and includes a sensing device preferably including a first capacitor plate movable with the tool and a second capacitor plate movable as the tool should be moved. An oscillating signal is applied to the plates and the capacitance of the plates is measured by a phase discriminator with the output applied to a transducer which moves the tool to a corrected position. Preferably the transducer is in the form of a magnetostrictive member actuated by the output of a triggering circuit actuated by the output from the phase discriminator.

Referring now in detail to the drawings, there is shown in FIG. 1 a feed screw 11 driven by an electric motor drive 12 to advance a drive nut 13 to the right, as viewed in FIG. 1, along with a power or drive carriage 14 rigid with the drive nut 13. An electrostatic measuring screw 15 aligned with the screw 11 is keyed rigidly thereto by coupling 16. A magnetostrictive transducer 17 connects a tool carriage 18 carrying a tool 19 to the drive carriage 14, and the carriage 18 carries an electrostatic measuring nut 20 rigidly therewith. The transducer 17 is disclosed and claimed in co-pending application Serial No. 48,007, filed by Marvin F. Royston on the same date as this application and assigned to the common assignee. Certain features of the electrostatic measuring screw 15 and nut 20, and the servo system are disclosed and claimed in co-pending application Serial No. 824,665, filed July 2, 1959, now Patent No. 3,030,578, and co-pending application Serial No. 48,024, filed on the same day as this application, the latter two applications being filed by Gerhard Lessman and assigned to the common assignee.

The tool 19 is advanced to the right or left, as viewed in FIG. 1, in accordance with a signal pattern control of the motor drive 12 as a lens blank 25 rotated by a holder 26 and a driven spindle 27 is advanced upwardly at a substantially uniform rate of speed to cut an aspheric surface 25a on the lens blank. The screw 11 feeds the nut 13 and the tool 19 accurately within predetermined limits of error, and this error of feed of the tool is corrected by the servo system to within one-half of a micro-inch. The error is detected by the measuring screw 15 and nut 20 which have very precise, interleaving, electro-conductive thread face portions 15a and 20a and 20b shown greatly out of scale in the broken away portion of the nut 20. The air gaps 15b and 15c between the interleaving, opposed electroconductive face portions 15a and 20a and 20b form a pair of capacitors, which, when the thread of the nut 20 is precisely centered longitudinally relative to the thread of the screw 15, are of the same capacitive magnitude. However, when the interleaving portions of these threads, which interleave along the entire length of the nut 20, are not centered longitudinally relative to each other, there is a capacitive unbalance between the two capacitors.

The two capacitors formed by the air gaps 15b and 15c between the thread face portions 15a, 20a and 20b are connected in adjacent arms of a bridge circuit 31 having equal resistors 32 and 33 and a calibrating potentiometer 34 in the other arms thereof. A grounded adjustable capacitor 30 is connected to one input corner of the bridge circuit 31. Tap 35 of the potentiometer is connected to a voltage dividing or sensing resistor 36 which forms the output of the bridge circuit 31. A known ten kilocycle oscillator 37 supplies the input power to the bridge circuit 31 through voltage divider 38 and transformer 39, and also supplies a reference phase and frequency signal to a known phase discriminator circuit 40 through transformer 41. The transformer 41 has a center-tapped secondary winding 41a supplied with positive D.C. potential from a suitable source (not shown). Any ten kilocycle output of the bridge circuit is shifted in phase from the input by reason of unbalance of the capacitors formed by thread faces 15a, 20a and 20b is applied to a known ten kilocycle amplifier 42, which amplifies the signal to an amplitude in the order of that of the reference signal applied to the phase discriminator by the oscillator 37 and supplies the amplified signal through transformer 43 to the phase discriminator 40. The output of the phase discriminator and a known ten kilocycle filter 44 is in the form of a D.C. voltage whose amplitude is dependent upon the degree of phase shift, the detecting circuit just described serving to detect even a shift of a few degrees of one cycle caused by the two measuring capacitors.

The wiper 35 is set so that when the thread faces 20a and 20b lag less than one-half of a micro-inch relative to centered positions relative to thread 15a for advance of the nut 20 to the right, the bridge 31 is balanced and has no output. The output from the filter 44 is applied sequentially to a known transistor emitter-follower amplifier stage 51, a known transistor amplifier stage 52 and a known two-transistor trigger stage 53, a rectifier 54 also being provided in the stage 51. When the nut 20 lags the correct position thereof in movement of the nut toward the right by as much as one-half of one micro-inch, the unbalance of the two capacitors triggers the circuit 53 to supply driving power through a resistance-capacitance network 55 to a winding 56 on a magnetostrictive core 57 of the transducer 17. This power elongates the core 57 to move the nut 20 and tool 19 to the right relative to the drive carriage 14 and the measuring screw 15. As the nut 20 moves to the right slightly past the one-half micro-inch lag position thereof relative to the screw 15, the output of the error detecting or sensing circuit to the trigger circuit 53 drops to a signal slightly below the triggering level, and the circuit 53 shuts off the power to the transducer circuit. However, the resistance-capacitance network 55 continues to supply power to the coil 56 to move the nut 20 to its precise centered position. Then, as the power from the resistance-capacitance network is dying out, the core 57 begins to contract, and, if the position of the nut 13 is still in error by as much as one-half microinch, the error is again detected and corrected. Thus, error is kept to just slightly greater than one-half microinch.

The embodiment of the invention shown in FIG. 2 includes a known ten kilocycle oscillator 61 supplying a bridge circuit 62 and a phase discriminator circuit 63 through respective transformers 64 and 65. The secondary of transformer 64 and a voltage divider 66 form the input and one side of the output to bridge circuit 62, which has the electrostatic thread faces 15a and 20a and 20b forming adjacent arms which in turn are mechanically connected to magnetostrictive core 57 of the transducer 17 as in the system of FIG. 1. The bridge also has equal resistors 67 and 68 and adjustable resistors 69 and 70 for setting the bridge to the desired balance at the precise point of lag of the measuring nut from the longitudinally centered position of the thread faces 15a and 20a and 20b.

The output of unbalance of the bridge circuit 62 is applied to a ten kilocycle amplifier 71 shifted in phase in accordance with the extent of unbalance of the bridge circuit. The amplifier 71 has serially a first emitter-follower stage 72, an amplifier stage 73, a second emitter-follower stage 74, a second amplifier stage 75, a third emitter-follower stage 76, and a final amplifier stage 77, the function of the emitter-follower stages 72, 74 and 76 being to isolate and prevent any feed-back to the bridge circuit 62. The amplifier 71 amplifies the ten kilocycle error voltage to bring it, with transformer 78, to substantially the same level as the reference voltage applied to the phase discriminator circuit 63 by the transformer 65. The error signal is magnified greatly by the phase discriminator circuit and applied as a direct current potential serially through a ten kilocycle filter network 79 and transistor amplifier stages 80 and 81 to a trigger circuit 82. When there is a predetermined lag, the circuit 82 is triggered to supply power to resistance-capacitance network 83 and winding or coil 56 of the transducer 17. This elongates the core 57 to correct the lag to slightly less lag than the triggering lag, and then the triggering circuit shuts off the power to the transducer circuit.

The circuit shown in FIG. 3 is a trigger circuit including amplifying stages 91 and 92 receiving power from the ten kilocycle filter 44 (FIG. 1) and applying the output of the error signal to a trigger circuit 93 (FIG. 3) which is very similar to the trigger circuit 53 (FIG. 1). The circuit 93 (FIG. 3) when triggered applies a voltage through network 94 to turn on transistor valving circuit 95 to supply power to resistance-capacitance network 96 and coil 57 of the transducer 17.

The servo systems described above are very fast and maintain the tool 19 at its correct position with the amplitude of hunting very low, the fast circuitry providing a high frequency of pulsing to the transducer 17 while the resistance-capacitance networks keep the variation of the power applied to the transducer very low.

While the invention is thus described, it is not wished to be limited to the precise details described, as changes may be readily made without departing from the spirit of the invention.

What is claimed is:

1. In a servo system including a tool and means for moving the tool within predetermined limits of error, the combination therewith of an electrostatic screw, an electrostatic nut forming a pair of capacitors with the electrostatic screw, bridge circuit means including the capacitors in separate arms thereof, oscillator means for supplying a reference alternating current signal to the bridge circuit means, amplifying means for amplifying the output of the bridge circuit means, phase discriminator means responsive to phase difference between the input to the bridge circuit means and the amplified output therefrom, an isolating follower amplifier stage driven by the output of the phase discriminator circuit, amplifier means driven by the output of the isolating follower amplifier stage, a trigger circuit operable by the output of the transistor amplifier means, and transducer means operable by the trigger circuit to move the tool relative to the means for moving the tool.

2. In a servo system including a tool and means for moving the tool within predetermined limits of error, the combination therewith of an electrostatic screw, an electrostatic nut forming capacitor means with the electrostatic screw, bridge circuit means including the capacitor means, oscillator means for supplying a reference alternating current signal to the bridge circuit means, amplifying means for amplifying the output of the bridge circuit means, phase discriminator means responsive to phase difference between the input to the bridge circuit means and the amplified output therefrom, amplifier means driven by the output of the phase discriminator means, and transducer means operable by the amplifier means to move the tool relative to the means for moving the tool.

3. In a servo system including a tool and means for moving the tool within predetermined limits of error, the combination therewith of an electrostatic screw, an electrostatic nut forming capacitor means with the electrostatic screw, bridge circuit means including the capacitor means, oscillator means for supplying a reference alternating current signal to the bridge circuit means, amplifying means for amplifying the output of the bridge circuit means, phase discriminator means responsive to phase difference between the input to the bridge circuit means and the amplified output therefrom, a follower circuit driven by the output of the phase discriminator circuit, amplifier means driven by the output of the follower circuit, and transducer means operable by the amplifier means to move the tool relative to the means for moving the tool.

4. In a servo system including a tool and means for moving the tool within predetermined limits of error, the combination therewith of an electrostatic screw, an electrostatic nut forming a pair of capacitors with the electrostatic screw, bridge circuit means including the capacitors in separate arms thereof, oscillator means for supplying a reference alternating current signal to the bridge circuit means, amplifying means for amplifying the output of the bridge circuit means, phase discriminator means responsive to phase difference between the input to the bridge circuit means and the amplified output therefrom, an emitter-follower transistor amplifier stage driven by the output of the phase discriminator circuit, transistor amplifier means driven by the output of the emitter-follower transistor amplifier stage, a trigger circuit operable by the output of the transistor amplifier means, and transducer means operable by the trigger circuit to move the tool relative to the means for moving the tool.

References Cited in the file of this patent

UNITED STATES PATENTS

| | | |
|---|---|---|
| 2,476,496 | Kleever | July 19, 1949 |
| 2,774,932 | Patton | Dec. 18, 1956 |
| 2,867,759 | Comstock | Jan. 6, 1959 |
| 2,887,636 | La Hue | May 19, 1959 |
| 2,941,135 | Anderson | June 14, 1960 |
| 2,962,641 | Maltby et al. | Nov. 29, 1960 |

OTHER REFERENCES

Cockrell, W. D.: Industrial Electronic Controls, McGraw-Hill, New York, 1944; page 140, Fig. 118.